(12) United States Patent
Bosacco

(10) Patent No.: US 7,797,811 B2
(45) Date of Patent: Sep. 21, 2010

(54) METHOD FOR FASTENING SHEET MATERIAL

(76) Inventor: Stephen A. Bosacco, 102 Fitch Rd., Cape May Courthouse, NJ (US) 08210

( * ) Notice: Subject to any disclaimer, the term of this patent is extended or adjusted under 35 U.S.C. 154(b) by 158 days.

(21) Appl. No.: 12/283,601

(22) Filed: Sep. 15, 2008

(65) Prior Publication Data
US 2009/0049676 A1 Feb. 26, 2009

Related U.S. Application Data

(62) Division of application No. 11/287,423, filed on Nov. 28, 2005, now abandoned.

(51) Int. Cl.
*B23P 11/00* (2006.01)
(52) U.S. Cl. .................................... 29/525.01
(58) Field of Classification Search ............ 29/525.01, 29/434, 428; 411/487; 72/88
See application file for complete search history.

(56) References Cited

U.S. PATENT DOCUMENTS

| 268,880 | A | * | 12/1882 | Estabrook | 470/34 |
| 4,279,190 | A | * | 7/1981 | Hummel | 411/487 |
| 4,966,024 | A | * | 10/1990 | Hewison | 72/88 |

* cited by examiner

*Primary Examiner*—John C Hong
(74) *Attorney, Agent, or Firm*—Peter Tribulski

(57) ABSTRACT

The invention relates to a system of fastening sheet material cladding onto substrates with hammer driven fasteners. The fasteners are cylindrical and have a first diameter at a tip end which is larger than a second diameter at a head end. When the fastener is driven through sheet material a hole is produced which is larger in diameter than the portion of the fastener adjacent the head. The sheet material is free to move laterally relative to the fastener because of the oversized hole that is produced by the oversized tip of the fastener. Additionally, deformation or dimpling is avoided because the small-diameter portion of the fastener does not produce axial frictional forces on the sheet material as it passes through the sheet material.

3 Claims, 3 Drawing Sheets

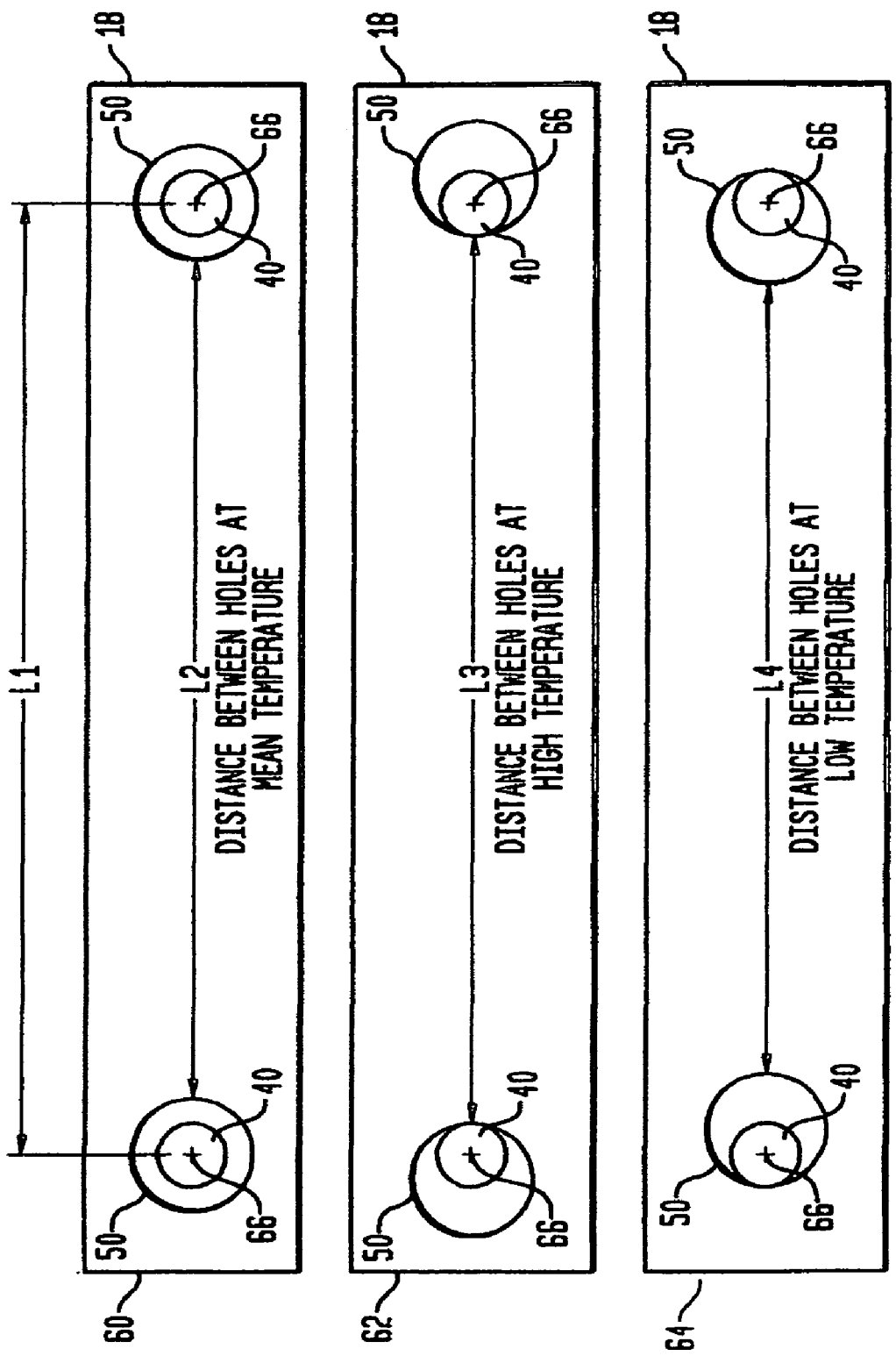

METHOD FOR FASTENING SHEET MATERIAL

RELATED APPLICATIONS

This is a Divisional Application of a Parent application Ser. No. 11/287,423 originally filed on Nov. 28, 2005 now abandoned entitled "Fastener for Sheet Material".

BACKGROUND OF THE INVENTION

This invention generally relates to apparatus and methods for attaching deformable sheet material to a substrate. More particularly, the invention provides for a fastener that is useful in applying cladding material onto a nailable substrate such as wood.

In the building construction industry there is a need to apply a cladding material such as aluminum of vinyl sheet material to wood members of buildings. This is done to improve an overall appearance of a building and to provide some protection for the underlying wood member. In that context, the sheet material primarily perform a cosmetic role.

Typically, nails are used to attach the sheet material to the wood members. In order to preserve the cosmetic properties of the sheet material, the nails are provided with heads which are colored to match the color of the sheet material. In the prior art, nails were driven through the sheet material and into the underlying wood. This technique produced a secure attachment of the sheet material, but it also produced a visible distortion or dent in the sheet material in the region of the nail. These dents result from frictional forces that develop when the nail shaft is driven through the sheet material. Dents are undesirable because they reduce the overall cosmetic value of the sheet material.

In order to reduce or eliminate formation of the dents, some tradesmen employ a practice of pre-drilling holes in the sheet material. The pre-drilled holes are made with a diameter slightly larger than a diameter of a shaft of the nail. Attachment is performed by placing the shaft of the nail into the pre-drilled hole and then driving it into the wood. When this technique is used, the shaft of the driven nail does not exert a frictional force on the sheet material and consequently dents are not formed.

However, pre-drilling holes in sheet material at the application stage is a difficult and time consuming task. Sheet material are often used for cladding of building fascia. In these cases a worker usually performs the application task from a ladder or scaffolding. It is commonly the case that the worker will need to hold a piece of the sheet material with one hand while driving a nail with the other hand. Pre-drilling holes in this setting is a difficult and onerous task.

As can be seen, there is a need for a sheet material application system that reduces deleterious effects of nail denting encountered in the prior art. More particularly, there is a need for such a system that does not require pre-drilling of the sheet material at the time of application.

SUMMARY OF THE INVENTION

In one aspect of the present invention a fastener comprises a cylindrical shaft with an insertion tip formed at a first end of the shaft and a head formed at a second end of the shaft. The shaft comprises at least two cylindrical members of different diameters. A first cylindrical member with a first diameter D1 is contiguous with the first end of the shaft. A second cylindrical member with a second diameter D2 is contiguous with the second end. The second diameter D2 is smaller than the first diameter D1.

In another aspect of the present invention a method for attaching sheet material to a substrate comprises the steps of supporting the sheet material adjacent the substrate; driving a cylindrical fastener having a first diameter D1 along a first portion of its length and a second smaller diameter D2 along a second portion of its length through the sheet material and into the substrate to produce a hole in the sheet material that is as large as the first diameter; and driving the fastener further into the substrate to position the second portion of the fastener into alignment with the sheet material.

These and other features, aspects and advantages of the present invention will become better understood with reference to the following drawings, description and claims.

BRIEF DESCRIPTION OF THE DRAWINGS

FIG. 4 is schematic diagram illustrating one aspect of the present invention.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention may be useful for field application of sheet material as a cosmetic and protective cladding onto building members. For illustrative purposes, the following description is of a nailable fastener used to attach sheet material such as aluminum to a wood substrate such as a building fascia. However, it is understood that other applications can be substituted for the subject attachment system.

The present invention may prevent undesirable denting in the sheet material during a nailing process. The present invention may prevent this condition without a need to pre-drill holes for nail shafts. This is accomplished by utilizing a nail with different shaft diameters along its length.

Figure 1:
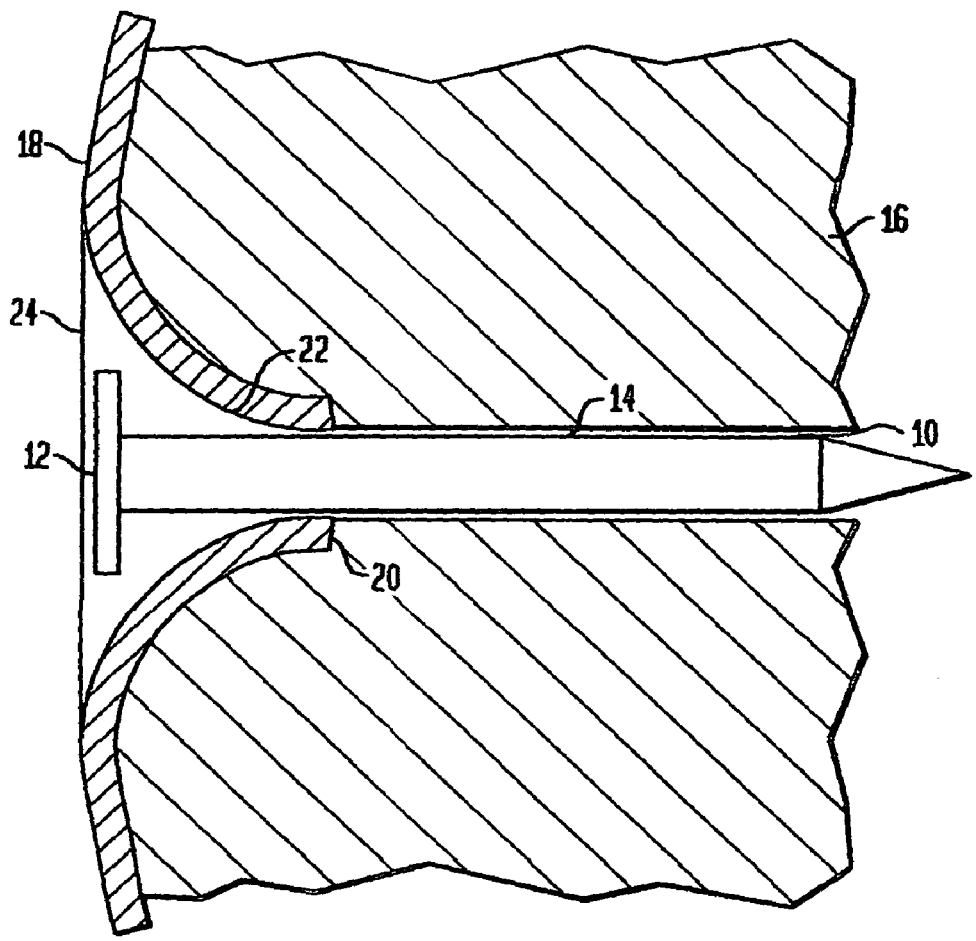
FIG. 1 is a cross-sectional view of a fastener employed in accordance with the prior art.

Referring now to FIG. 1 there is shown a prior-art fastener 10 comprising a head 12 and a cylindrical shaft 14. The prior-art fastener 10 is shown embedded into a substrate 16 and attaching a portion of sheet material 18 to the substrate.

FIG. 1 illustrates a prior-art condition in which the prior-art fastener 10 has been driven through the sheet material 18 and into the substrate 16. The act of driving the prior-art fastener 10 though the sheet material produces a perforation 20 in the sheet material 18. The perforation 20 has a diameter that is the same as the diameter of the cylindrical body 14 of the prior-art fastener 10. Frictional engagement develops between the cylindrical body 14 and a portion 22 of the sheet material 18 surrounding the perforation 20. As the prior-art fastener 10 is driven further into the substrate 16, this frictional engagement produces an inwardly dragging force on the portion 22 of the sheet material 18. This dragging force produces a distortion or dimple 24 in the sheet material 18. This dimple 24 may have a diameter that is substantially lager than a diameter of the head 12 of the prior-art fastener 10. Thus the head 12 does not cover the dimple 24 and the dimple 24 remains a visible and unsightly blemish after attachment of the sheet material 18 is complete.

Figure 2:
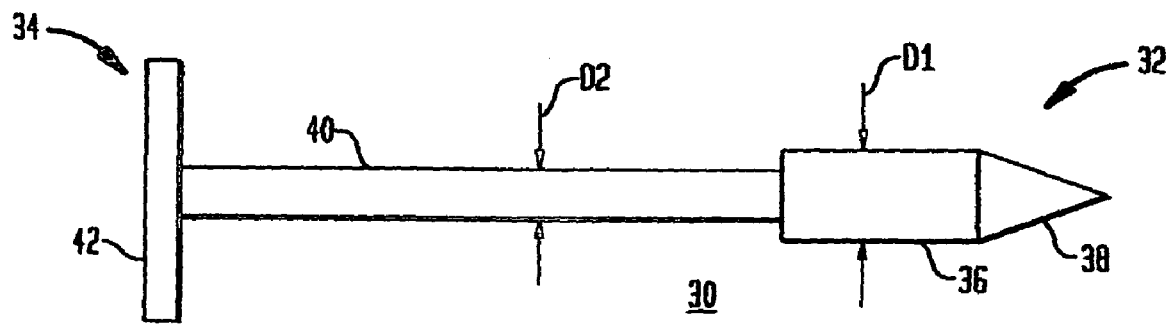
FIG. 2 is an illustration of a fastener constructed according to the present invention.

Referring now to FIG. 2, there is shown a fastener, designated generally by the numeral 30, which is constructed in accordance with the present invention. The fastener 30 comprises an insertion tip end 32 and a head end 34. A first cylindrical member 36 with a first diameter D1 is positioned at the tip end 32. The first cylindrical member 36 is provided with a tapered tip 38 adapted to penetrate sheet materials and substrates. A second cylindrical member 40 having a second diameter D2 is positioned at the head end 34 of the fastener 30. The second cylindrical member 40 is provided with a flattened head 42 adapted to be struck with a hammer to drive the fastener 30 through sheet material and into a substrate. The first diameter D1 is greater than the second diameter D2.

Figure 3:
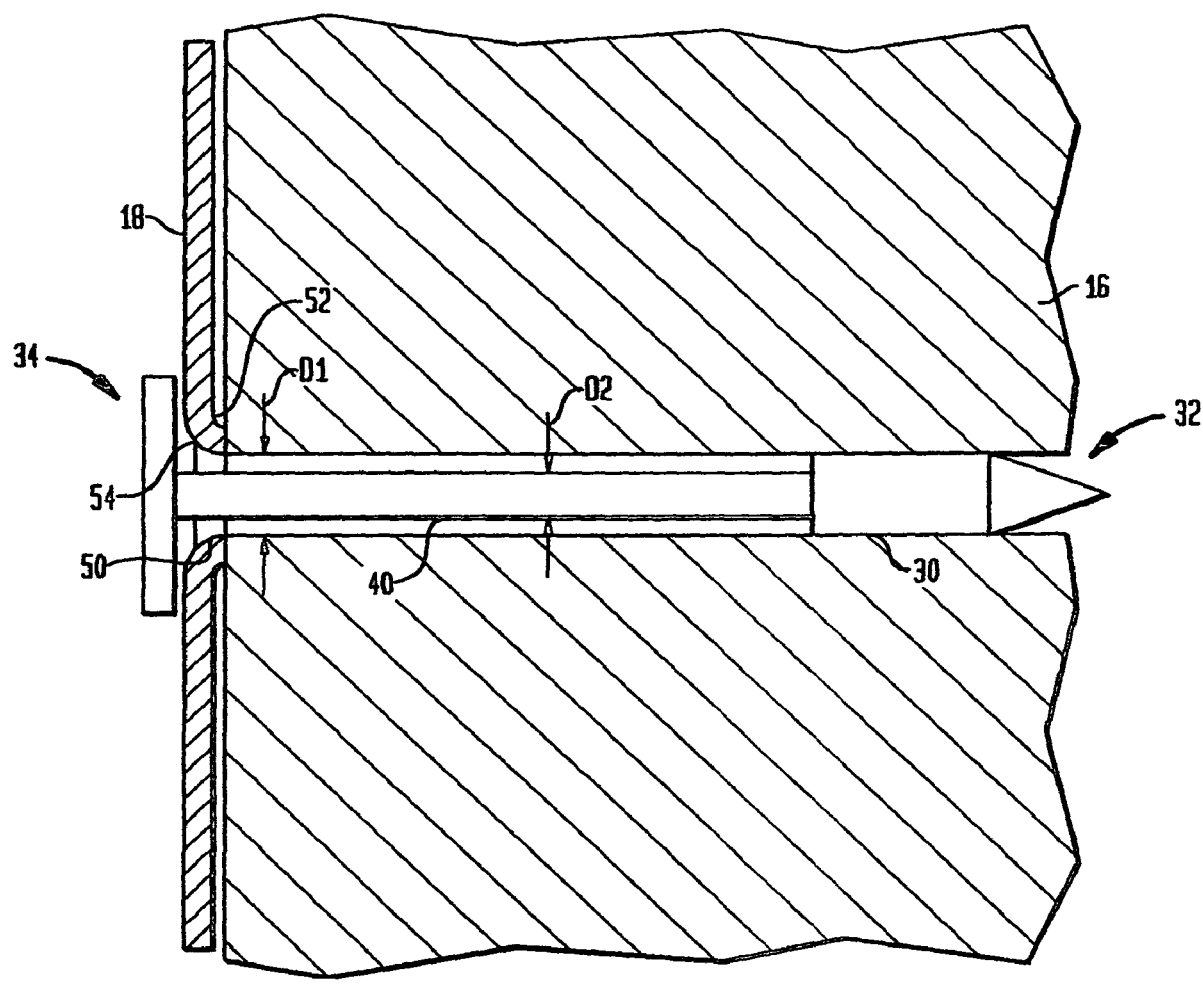
FIG. 3 is a cross sectional view of the fastener of FIG. 2 employed in accordance with the present invention.

Referring now to FIG. 3, the fastener 30 is shown in a driven position. In other words, the fastener 30 is shown as it would appear after having been driven through the sheet material 18 and into the substrate 16. it can be seen that tip end 32 of the fastener 30 produces a hole 50 in the sheet material 18. The hole 50 has a diameter that is at least as large as the diameter D1 of the cylindrical member 36. The cylindrical member 40 at the head end 34 of the fastener 30 is not in contact with a portion 52 of the sheet material 18 that surrounds the hole 50. This, of course, is because the hole 50 has a diameter D1 which is greater than the diameter D2 of the cylindrical member 40.

It can also be seen in FIG. 3 that a small dimple 54 may form in the sheet material 18 when the tip end 32 of the fastener 30 passes through the sheet material. But the dimple 54 is small in comparison to the dimple 24 of FIG. 1 which is produced with the prior art fastener 10. The small dimple 54 is a product only of penetration of the tip end 32. There is no frictional engagement with the cylindrical member 40 as it passes through the hole 50. Consequently, the sheet material remains undisturbed as the fastener 30 is driven into the substrate 16.

With a proper selection of diameters D1 and D2, the dimple 54 is produced small enough to be covered by the head 42 of the fastener 30. Thus the fastened sheet material is applied without visible surface distortion.

Referring now to FIG. 4, there are shown schematic diagrams that illustrate a relationship between diameters D1 and D2 in the context of fastening the sheet material 18 in a manner which not only provides for distortion free application, but also provides for distortion-free thermal expansion and contraction of the sheet material 18.

In a diagram 60 a segment of the sheet material 18 is shown with attachment points 66 being located from one another a nominal distance L1. Diagram 60 portrays the sheet material at a mean temperature relative to the extremes of temperature to which the sheet material 18 may be exposed. The holes 50 are shown with a spacing L2 between them. The holes 50 have a diameter D1 as discussed above with respect to FIG. 3. The cylindrical members 40 have a smaller diameter D2.

Diagram 62 illustrates the sheet material 18 after it has experienced thermal expansion at a temperature higher than the mean temperature of diagram 60. A distance between the holes 50 is now shown as L3. The distance L3 is greater than L2.

Diagram 64 illustrates the sheet material 18 after it has experienced thermal contraction at a temperature lower than the mean temperatures of diagram 60. A distance between the holes 50 is now shown as L4. The distance L4 is smaller than L2.

In a typical construction application, the sheet material 18 might experience exposure to temperature variations of about 80° to 100° F. In a similarly typical application, the sheet material may be fastened at intervals of about 20 to 30 inches. In this context, a 20 to 30 inch span of aluminum may experience a temperature-related length change of about $1/16$". Vinyl sheet materials may experience similar temperature-related length changes.

It can be seen that L3 may become about $1/16$" greater than L4 as temperatures change. In order to assure the sheet material is not constrained by the cylindrical members 40, it is necessary to provide that the diameter D1 of the hole 50 is at greater than the diameter D2 of the cylindrical member by an amount that is at least as large as one-half of the difference between L3 and L4. In other words, it is desirable to employ a fastening method in which $D1-D2 \geq (L3-L4)/2$.

In order to allow the sheet material 18 to freely expand and contract, it is desirable to drive the fastener into the substrate 16 only far enough to retain the sheet material 18 in close proximity to the substrate 16 but sufficiently distant from the substrate 16 so that the sheet material 18 is free to move laterally under the head 42 of the fastener 30. In other words, the fastener 30 may be driven to provide only a light frictional engagement between the head 42 and the sheet material 18.

We have found that the fastener 30 performs successfully to fasten aluminum cladding when the cylindrical member 40 has a diameter at least as large as about $1/16$" to about $1/8$". We have also found that it is desirable to construct the fastener 30 so that its overall length is about 10 to 20 times as great as the diameter D2. This length to diameter ratio provides sufficient stiffness in the fastener 30 so that the fastener 30 does not bend when driven into the substrate 16. Also we have found that undesirable bending of the fastener 30 is avoided when the diameter D1 of the first cylindrical member 36 is no greater than about 2 to 3 times the diameter D2. Additionally, we have found that it is desirable to construct the fastener 30 so that an axial length of the first cylindrical member 36 is no greater than about 10 to 25% of the axial length of the second cylindrical member 40.

It should be understood, of course, that the foregoing relates to exemplary embodiments of the invention and that modifications may be made without departing from the spirit and scope of the invention as set forth in the following claims.

I claim:

1. A method for attaching sheet material to a substrate comprising the steps of:
   supporting the sheet material adjacent the substrate;
   driving a cylindrical fastener, having first diameter D1 along a first portion of its length and a second smaller diameter D2 along a second portion of its length, through the sheet material and into the substrate to produce a hole in the sheet material that is as large as the first diameter;
   driving the fastener further into the substrate to position the second portion of the fastener into alignment with the sheet material; and
   wherein the fastener is driven only far enough into the substrate to retain the sheet material in close proximity to the substrate but sufficiently distant from the substrate so that the sheet material is free to move laterally under a head of the fastener.

2. The method of claim 1 wherein:
   the sheet material are fastened with a plurality of the fasteners with a spacing between the fasteners; and
   the spacing between fasteners when combined with a difference between the first and second diameters of the fasteners is suitable to permit thermal expansion of the sheet material without being constrained by the fasteners.

3. The method of claim 2 wherein:
   L1 is a distance between fasteners;
   L2 is a distance between holes produced by the fasteners at a mean temperature;
   L3 is a distance between the holes at a temperature extreme higher than the mean;
   L4 is a distance between the holes at a temperature extreme lower than the mean; and
   the diameter D1 and the diameter D2 are interrelated in accordance with a relationship $D1-D2 \geq (L3-L4)/2$.

* * * * *